(No Model.)
G. L. GRASS.
AUTOMATIC BICYCLE LOCK.
No. 602,397. Patented Apr. 12, 1898.
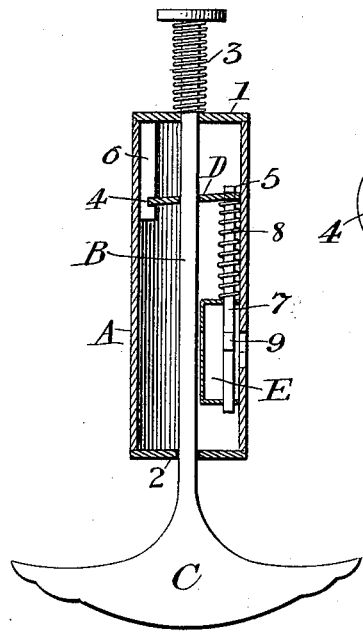
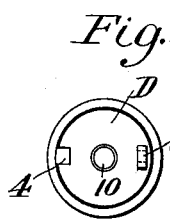
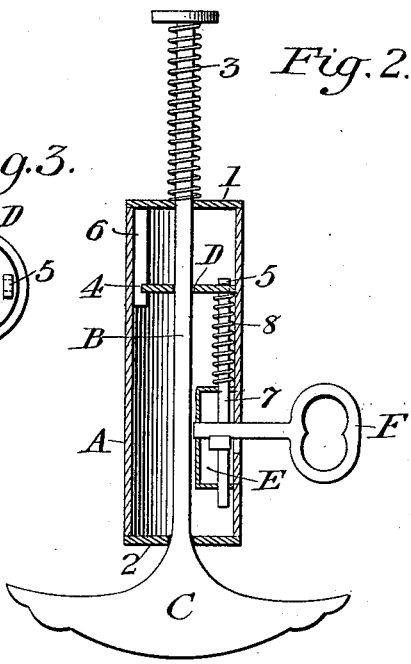
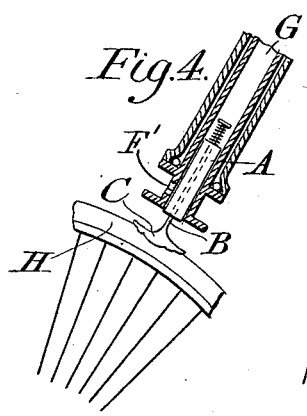
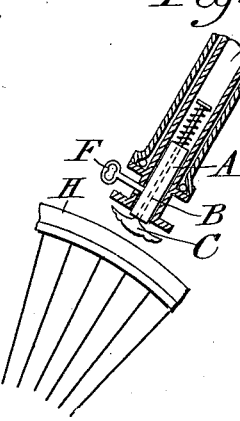
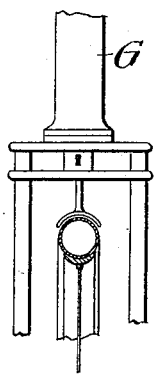
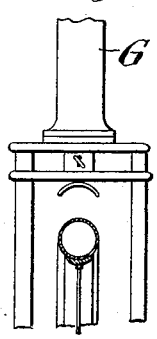
Witnesses:
Herbert Ira Lynne
Geo. H. Smythe
Inventor:
Geo L Grass

UNITED STATES PATENT OFFICE.

GEORGE L. GRASS, OF KINGSTON, CANADA.

AUTOMATIC BICYCLE-LOCK.

SPECIFICATION forming part of Letters Patent No. 602,397, dated April 12, 1898.

Application filed June 11, 1897. Serial No. 640,364. (No model.)

*To all whom it may concern:*

Be it known that I, GEORGE LEWIS GRASS, a British subject, residing at the city of Kingston, in the county of Frontenac and Province of Ontario, Canada, have invented a new and useful Automatic Bicycle-Lock, of which the following is a specification.

My invention relates to an improvement in locks designed to protect bicycles or other vehicles from theft by preventing the rotation of one wheel thereof; and the object of my invention is to provide a lock which may be fixed inside the tubular framework of a vehicle and which will operate by automatically locking a small plate in any position when depressed to any extent against the tire of one of the wheels.

My invention is illustrated in the accompanying drawings, in which—
Figures 1 and 2 are vertical sections of a lock adapted to be inserted in the tubular framework above the front wheel of a bicycle. Fig. 3 is a cross-section through an internal locking-disk; Figs. 4 and 6, vertical sections showing the lock in position in the bicycle-frame and in operation in each case, and Figs. 5 and 7 similar sections showing the lock in position but not in operation.

Similar letters and figures refer to similar parts throughout the several views.

As shown in the views, the outer casing of the lock is a metal cylinder A of such size as to fit closely in the tubular framework above the fork supporting the front wheel of a bicycle. It is closed at the ends by caps 1 and 2, through central apertures in which a shaft B, bearing a small brake-plate C, has a free vertical motion. A coiled spring 3 exerts an upward pressure upon the shaft B.
Inside the casing A the shaft B passes through a closely-fitting central aperture in a metal disk D, a notch 4 in one edge of which rests in a similar notch in a bar 6, attached to the casing of the lock. Through a hole 5 at the opposite edge of the disk a bar 7 passes, and by means of a cross-head will depress that edge of the disk when itself depressed. A coiled spring 8 exerts an upward pressure upon this edge of the disk.
The bar 7 passes through an inner lock-casing E, which may be of any desired construction, and a key F, which will turn in this lock, operates to depress the bar 7 by working in a notch 9 therein and will so depress the disk D.

The complete lock (shown in Figs. 1 and 2) may be inserted in the inner tubing of a bicycle-frame, as shown in Figs. 4 and 5, and may be held in position by screws through the tubing, or as may be desired. I would prefer to make the edges of the cap 2 project around the cylinder A, so that they would prevent the lock from being pressed up the tubing. This projecting rim could then be screwed or otherwise fastened to the flat surface of the end of the tubing in the crotch of the fork supporting the wheel.

A keyhole in the front of the tubing admits the key into the lock, as shown at F'.

To operate the lock, the plate C is pressed with the fingers against the tire H of the wheel. The disk D being held in a slightly-slanting position by the spring 8 will then, by pressure against the shaft B, automatically lock the shaft against any upward pressure and will so retain the plate C in as close contact with the tire as may be desired and so prevent rotation of the wheel. The shaft B, bearing the plate C, will snap back to its normal position as soon as the disk D is brought into a plane nearly perpendicular to the shaft by the turning of the key in the lock.

What I claim as new, and desire to secure by Letters Patent, is—

The combination in a lock adapted to be inserted in the tubular framework of a bicycle or other vehicle, with a shaft passing through the lock-case bearing a plate adapted to be pressed against the tire of a wheel, of a movable disk having an aperture in which the shaft fits closely, springs exerting pressure upon the shaft and upon one edge of the disk in a direction away from the wheel, an inner lock-case adapted to allow a corresponding key to depress the disk and release the shaft, and a connecting device between the disk and the inner lock, substantially as and for the purposes described.

GEO. L. GRASS.

Witnesses:
HERBERT IRA LYON,
GEO. H. SMYTHE.